United States Patent Office 2,846,463
Patented Aug. 5, 1958

2,846,463

6-ARYLOXYACYL DEHYDROABIETIC ACID ESTERS

Willard M. Hoehn, Wilmette, Ill., assignor to G. D. Searle & Co., Chicago, Ill., a corporation of Delaware No Drawing. Application July 6, 1956
Serial No. 596,142

7 Claims. (Cl. 260—468.5)

The present invention relates to a new class of resin acid derivatives, and is specifically concerned with 6-aryloxyacyl substitution products of dehydroabietic acid esters. The compounds of this invention can be represented by the structural formula

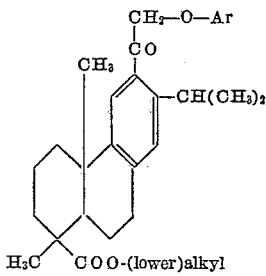

wherein the lower alkyl group is a straight- or branched-chain alkyl radical containing fewer than 9 carbon atoms, and the group Ar is an aromatic radical containing fewer than 9 carbon atoms. The term Ar can represent an aromatic hydrocarbon radical, such as phenyl, methylphenyl, dimethylphenyl, or ethylphenyl. It can also represent a halogen substitution product of any of the foregoing radicals, such as a chlorophenyl, bromophenyl, iodophenyl, chlorotolyl, bromotolyl, iodotolyl, or a halogenated xylyl or ethylphenyl radical. The term Ar can represent an aromatic radical containing an alkoxy substituent, such as methoxyphenyl, dimethoxyphenyl, or ethoxyphenyl. A limiting feature of the class of aromatic radicals which can be represented by the term Ar in the foregoing structural formula is that it is limited to aromatic radicals containing fewer than 9 carbon atoms.

Satisfactory starting materials for the manufacture of the compounds of this invention are the lower alkyl esters of dehydroabietic acid, some of which are disclosed in U. S. 2,201,237 to Littmann, and elsewhere. These lower alkyl esters of dehydroabietic acid undergo Friedel-Crafts reactions with phenoxyacetyl chloride and with alkyl-substituted, halogen-substituted, and alkoxy-substituted phenoxyacetyl chlorides to yield the aromatic ethers of this invention. The manufacture of these aromatic ethers can also be accomplished in an alternate manner. One can employ as starting material a lower alkyl ester of a 6-haloacetyldehydroabietic acid, for example methyl 6-chloroacetyldehydroabietate, prepared by the aluminum chloride-catalyzed reaction of methyl dehydroabietate with chloroacetyl chloride. By the reaction of this compound in a basic medium with phenol, an alkyl-substituted phenol, a halogen-substituted phenol, or an alkoxy-substituted phenol, the aromatic ethers of the present invention are obtained. In place of the phenol in a basic reaction medium, it is an obvious equivalent to employ an alkali metal salt of the phenol.

The new compositions of the present invention have valuable pharmacological properties. They have hormonal actions, and specifically are active both as estrogenic agents, and as agents which produce useful effects in the transport and metabolism of cholesterol. They reduce the serum ratio of cholesterol to phospholipids, and are useful in the treatment of hypercholesterolemia and disorders associated therewith. The compositions of the present invention are also active anti-bacterial agents, being effective, for example, against *E. coli* and *B. subtilis*.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.), pressures in millimeters (mm.) of mercury, and quantities of materials in parts by weight.

*Example 1*

To a solution of 31.5 parts of methyl dehydroabietate and 20.5 parts of p-chlorophenoxyacetyl chloride in 360 parts of nitrobenzene, maintained at about 0–5° C., there is added 26 parts of aluminum chloride over a 15 minute period. The mixture is stirred at this temperature for 1 hour and then maintained at about 0–10° C. for an additional 48 hours, after which it is poured into 500 parts of ice water and separated into phases. The nitrobenzene phase is washed with a total of 500 parts of water in 5 portions, a total of 200 parts of 2% sodium hydroxide solution in 2 portions, and finally with portions of water until the wash water is neutral. The nitrobenzene is removed by distillation with steam, and the oily, water-insoluble product which remains is separated, dried in a benzene solution, and recovered by vaporization of the solvent. The crude product thus obtained is dissolved in a minimum quantity of a 20 volume percent solution of benzene in petroleum ether and the resulting solution is poured on a chromatography column prepared from 1500 parts of silica. Impurities and by-products are removed by washing the column with mixtures of benzene and petroleum ether containing gradually increasing proportions of benzene, and with benzene. In a typical case, this result is achieved by washing the column, in sequence, with 3200 parts of a 30 volume percent solution of benzene in petroleum ether, with 800 parts of a 40 volume percent solution of benzene in petroleum ether, with 800 parts of a 60 volume percent solution of benzene in petroleum ether, with 1600 parts of an 80 volume percent solution of benzene in petroleum ether, with 8500 parts of a 90 volume percent solution of benzene in petroleum ether, with 3600 parts of benzene, and with 5400 parts of a 2 volume percent solution of ethyl acetate in benzene. Further elution of the column with a 2 volume percent solution of ethyl acetate in benzene then affords the principal product of the reaction. The appearance of this product is readily recognized by the weight peak which appears in the elution curve. Thus, over 20 parts of this product is eluted from the column over a relatively short interval. The oily fractions corresponding to this weight peak are combined and purified by distillation at a pressure of about 0.02 mm. At a boiling point of about 220–225° C. there is collected a distillate of purified methyl 6-(p-chlorophenoxyacetyl) dehydroabietate. This compound has an ultraviolet absorption maximum at 260 millimicrons with a molecular extinction coefficient of about 7000. It has the structural formula

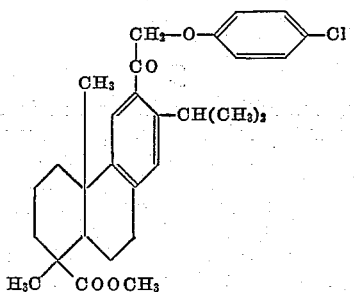

By the same procedure, with the substitution of 20.5 parts of o-chlorophenoxyacetyl chloride for the p-chlorophenoxyacetyl chloride, there is obtained methyl 6-(o-chlorophenoxyacetyl) dehydroabietate of the formula

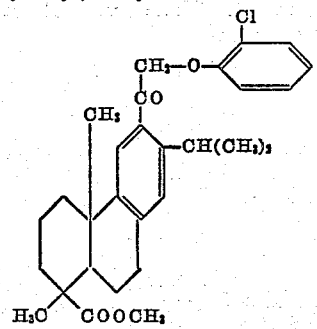

Example 2

A stirred solution of 33 parts of ethyl dehydroabietate, 25 parts of p-bromophenoxyacetyl chloride and 480 parts of nitrobenzene, maintained at about 0–5° C., is treated with a total of 26 parts of aluminum chloride, added in portions over a 15 minute period. The mixture is stirred at this temperature for 1 hour and then maintained at about 0–10° C. for an additional 48 hours, after which it is poured into 500 parts of ice water. The separated nitrobenzene phase is washed with a total of 500 parts of water in 5 portions, a total of 200 parts of 2% sodium hydroxide solution in 2 portions, and finally with several portions of water. The nitrobenzene is removed by distillation with steam, and the oily, water-insoluble product is separated, dried in a benzene solution, and recovered by vaporization of the solvent. The crude product thus obtained is dissolved in a minimum quantity of a 20 volume percent solution of benzene in petroleum ether and the resulting solution is poured on a chromatography column prepared from 1500 parts of silica. The column is washed successively with mixtures of benzene and petroleum ether containing gradually increasing proportions of benzene, with benzene, and with mixtures of benzene and ethyl acetate containing less than 10 volume percent of ethyl acetate. The eluates corresponding to the principal weight peak are combined and purified by distillation at a pressure of about 0.02 mm. At a bath temperature of about 255–260° C. there is collected a distillate of ethyl 6-(p-bromophenoxyacetyl) dehydroabietate. This compound has an ultraviolet absorption maximum at 260 millimicrons with a molecular extinction coefficient of about 7500. It has the structural formula

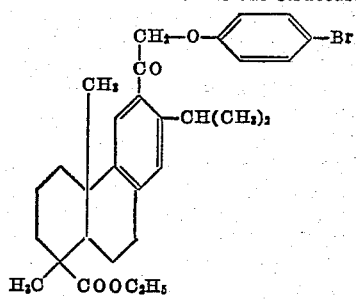

Example 3

A solution of 200 parts of methyl dehydroabietate, 720 parts of nitrobenzene and 79.5 parts of chloroacetyl chloride is cooled to about 0–5° C. and, with constant stirring, treated with a total of 170 parts of aluminum chloride added in small portions. The reaction mixture is maintained at about 5° C. for 48 hours and is then poured into 1000 parts of ice water. Ether (1400 parts) is added and the separated organic phase is washed with several portions of cold water, dried over anhydrous calcium sulfate and filtered. The ether and nitrobenzene are removed from the filtrate by distillation under reduced pressure, and the gummy residue is crystallized several times from methanol to give purified methyl 6-chloroacetyl-dehydroabietate which melts at about 119–120° C. and has the structural formula

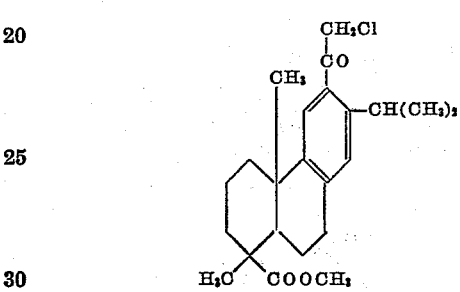

Example 4

To a solution of 39 parts of methyl 6-chloroacetyldehydroabietate in 320 parts of ethanol and 40 parts of water there is added a solution of 13.8 parts of o-methoxy-p-methylphenol, 60 parts of ethanol, 25 parts of water and 4 parts of sodium hydroxide. The resulting reaction mixture is heated under reflux for 2 hours, poured into 1000 parts of water, and heated under reduced pressure until most of the ethanol is removed by distillation. The insoluble gummy product is separated and dissolved in ether; the ethereal solution is washed with water, with 2% sodium hydroxide solution, and finally with several portions of water, after which it is separated and concentrated to dryness. The residual, gummy product is dissolved in a 1 volume percent solution of benzene in petroleum ether and poured on a chromatography column prepared from 1700 parts of silica. Impurities and by-products are removed from the column by elution with petroleum ether, with mixtures of petroleum ether and benzene containing gradually increasing proportions of benzene, and with benzene. In a typical case this result can be accomplished by washing the column in succession with the following solvents, wherein the percentages stated represent the volume percent of benzene in petroleum ether: 4000 parts of petroleum ether, 2500 parts of a 2% solution, 2500 parts of a 5% solution, 1300 parts of a 10% solution, 1300 parts of a 20% solution, 3000 parts of a 30% solution, 1600 parts of a 40% solution, 1600 parts of a 50% solution, 1600 parts of a 60% solution, 1600 parts of a 70% solution, 1600 parts of an 80% solution, and 7000 parts of benzene. Upon elution with a 2 volume percent solution of ethyl acetate in benzene, the desired reaction product is then removed from the column. The exact position at which this desired fraction is removed from the column cannot be accurately predicted, but it can be recognized by a pronounced weight peak in the elution curve, as over 20 parts of this crude product is removed from the column over a relatively short interval. The fractions corresponding to this weight peak are combined and distilled at a pressure of about 0.05–0.08 mm. There is collected a distillate of the desired fraction at a distillation temperature of about 215° C. (bath temperature of about 250–260° C.). For further purification this fraction is redistilled in a short-path apparatus at a pressure of about 0.04 mm., and a distillate boiling at about 185–190° C. (bath temperature about 225–240° C.) is collected. This compound is methyl 6-(o-methoxy-p-methylphenoxyacetyl)dehydroabietate, which has an ultraviolet absorption maximum at 260 millimicrons with a molecular extinction coefficient of about 9500. It has the structural formula

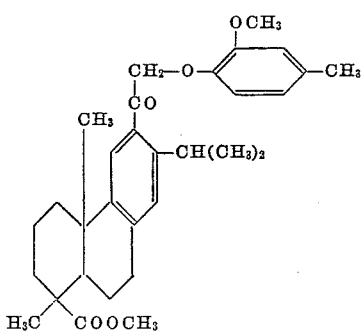

By the foregoing procedure, with the substitution of 13.8 parts of p-ethoxyphenol for the o-methoxy-p-methylphenol, there is obtained methyl 6-(p-ethoxyphenoxyacetyl)dehydroabietate of the formula

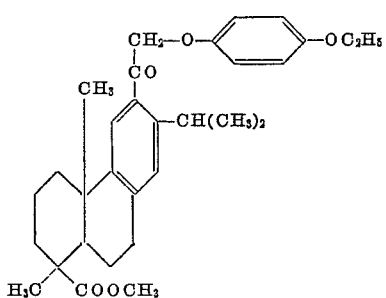

*Example 5*

To a solution of 12 parts of sodium phenoxide in 110 parts of ethanol and 15 parts of water there is added 12 parts of methyl 6-chloroacetyldehydroabietate, and the resulting mixture is heated under reflux for 1½ hours. The cooled reaction mixture is poured into 800 parts of water, and when separation of the insoluble product is complete, it is collected and dissolved in ether. The ethereal solution is washed with 2% sodium hydroxide solution and then with several portions of water, after which it is separated, dried and concentrated until substantially all of the ether is removed by vaporization. A solution of the residue in petroleum ether is poured on a chromatography column prepared from 700 parts of silica. Impurities and by-products are removed by washing the column with solutions of benzene and petroleum ether containing gradually increasing proportions of benzene. In a typical case this result is accomplished by washing the column successively with the following solvent mixtures, wherein the stated percentages represent the volume percent of benzene in petroleum ether: 3000 parts of a 20% solution, 3000 parts of a 30% solution, 3000 parts of a 40% solution, 4500 parts of a 50% solution, 4500 parts of a 60% solution, 3500 parts of a 70% solution, and 5000 parts of an 80% solution. Upon elution with benzene, there are then obtained eluates containing predominantly the desired compound. While the exact position of elution of the desired compound cannot be accurately predicted, its presence can be recognized by the appearance of a weight peak in the elution curve, as more than 5 parts of this product are eluted over a relatively short interval. The fractions corresponding to this weight peak are combined and distilled in a short-path apparatus at a pressure of about 0.04 mm. A distillate of the desired compound is obtained at a distillation temperature of about 215–218° C. (bath temperature of about 240–245° C.). An ultraviolet absorption maximum appears at 261 millimicrons, with a molecular extinction coefficient of about 10,100. This compound is methyl 6-phenoxyacetyldehydroabietate of the structural formula

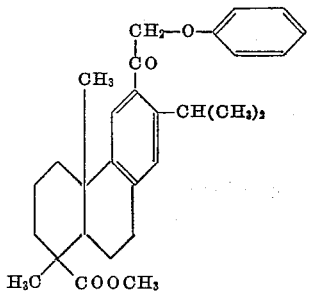

By the same procedure, with the substitution of 12 parts of sodium p-methylphenoxide for the sodium phenoxide, there is obtained methyl 6-(p-methylphenoxyacetyl)dehydroabietate of the structural formula

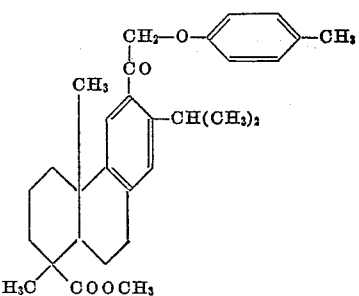

What is claimed is:
1. A compound of the structural formula

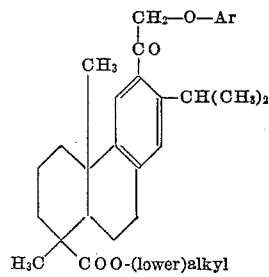

wherein Ar is a radical containing fewer than 9 carbon atoms, selected from the class consisting of aromatic hydrocarbon radicals, aromatic halohydrocarbon radicals in which the halogen substituent has an atomic number greater than 9, and aromatic alkoxyhydrocarbon radicals.

2. A compound of the structural formula

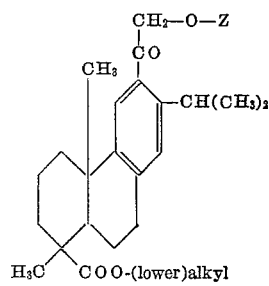

wherein Z is an aromatic hydrocarbon radical containing fewer than 9 carbon atoms.

3. Methyl 6-phenoxyacetyldehydroabietate.

4. A compound of the structural formula

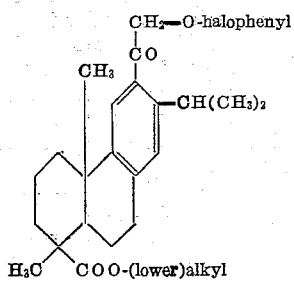

wherein the halogen substituent has an atomic number greater than 9.

5. Methyl 6-(p-chlorophenoxyacetyl) dehydroabietate.

6. A compound of the structural formula

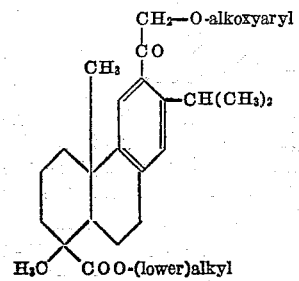

wherein the alkoxyaryl radical is an aromatic alkoxyhydrocarbon radical containing fewer than 9 carbon atoms.

7. Methyl 6-(o-methoxy-p-methylphenoxyacetyl)-dehydroabietate.

References Cited in the file of this patent

UNITED STATES PATENTS

| | | |
|---|---|---|
| 2,248,954 | Butenandt | July 15, 1941 |
| 2,767,162 | Picha | Oct. 16, 1956 |